(12) United States Patent
Sun et al.

(10) Patent No.: US 10,137,837 B2
(45) Date of Patent: Nov. 27, 2018

(54) REARVIEW MIRROR

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Shenglin Sun, Beijing (CN); Feng Bai, Beijing (CN); Yun Qiu, Beijing (CN); Zhidong Wang, Beijing (CN); Junguo Liu, Beijing (CN); Zhiguo Chen, Beijing (CN); Lihua Liu, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 187 days.

(21) Appl. No.: 14/908,829

(22) PCT Filed: Jul. 28, 2015

(86) PCT No.: PCT/CN2015/085300
§ 371 (c)(1),
(2) Date: Jan. 29, 2016

(87) PCT Pub. No.: WO2016/138731
PCT Pub. Date: Sep. 9, 2016

(65) Prior Publication Data
US 2017/0001569 A1    Jan. 5, 2017

(30) Foreign Application Priority Data

Mar. 3, 2015 (CN) .......................... 2015 1 0094425

(51) Int. Cl.
*G02F 1/133* (2006.01)
*G02F 1/1335* (2006.01)
(Continued)

(52) U.S. Cl.
CPC ................ *B60R 1/088* (2013.01); *B60R 1/12* (2013.01); *G02F 1/137* (2013.01);
(Continued)

(58) Field of Classification Search
CPC ............. B06R 1/088; B06R 2001/1215; G02F 1/13306; G02F 1/133553; G02F 1/133555; G02F 1/1343; G02F 1/134309
See application file for complete search history.

(56) References Cited

U.S. PATENT DOCUMENTS 4,589,735 A    5/1986 Saunders
5,253,109 A *  10/1993 O'Farrell ................ B60R 1/088
                                                     250/206

(Continued)

FOREIGN PATENT DOCUMENTS

CN    2480237 Y    3/2002
CN    2704507 Y    6/2005
(Continued)

OTHER PUBLICATIONS

First Chinese Office Action dated Jan. 17, 2017; Appln. No. 20150094425.8.
(Continued)

*Primary Examiner* — Jessica M Merlin
(74) *Attorney, Agent, or Firm* — Ladas & Parry LLP

(57) ABSTRACT

A rearview mirror, including a first substrate (100), a second substrate (200) cell-assembled to the first substrate (100), and a crystal material (300) filled between the first substrate (100) and the second substrate (200), a plurality of strip electrodes (11) are disposed on a side of the first substrate (Continued)

(100) that faces to the second substrate (200), an interval is formed between two adjacent strip electrodes (110), the strip electrodes (110) are made of a transparent electrode material, a planar electrode (210) capable of at least partially reflecting light is disposed on a side of the second substrate (200) that faces to the first substrate (100). In the present application, the refractive indices of the liquid crystal material (300) in the rearview mirror are changed by changing the voltage signal provided to the rearview mirror, such that an anti-glare operation mode of the rearview mirror is achieved.

20 Claims, 2 Drawing Sheets

(51) Int. Cl.
  *B60R 1/08* (2006.01)
  *G02F 1/1343* (2006.01)
  *G02F 1/137* (2006.01)
  *B60R 1/12* (2006.01)

(52) U.S. Cl.
  CPC ...... *G02F 1/13306* (2013.01); *G02F 1/13439* (2013.01); *G02F 1/133553* (2013.01); *G02F 1/133555* (2013.01); *G02F 1/134309* (2013.01); *B60R 2001/1253* (2013.01); *G02F 2203/02* (2013.01)

(56) References Cited

U.S. PATENT DOCUMENTS

| | | | |
|---|---|---|---|
| 2006/0007550 A1* | 1/2006 | Tonar | B60R 1/088 359/604 |
| 2010/0067093 A1 | 3/2010 | Feil et al. | |

FOREIGN PATENT DOCUMENTS

| | | | |
|---|---|---|---|
| CN | 1818745 A | | 8/2006 |
| CN | 201273979 Y | | 7/2009 |
| CN | 102897093 A | * | 1/2013 |
| CN | 203211204 U | | 9/2013 |
| CN | 104354646 A | | 2/2015 |
| CN | 104656294 A | | 5/2015 |

OTHER PUBLICATIONS

International Search Report and Written Opinion both dated Dec. 21, 2015; PCT/CN2015/085300.

* cited by examiner

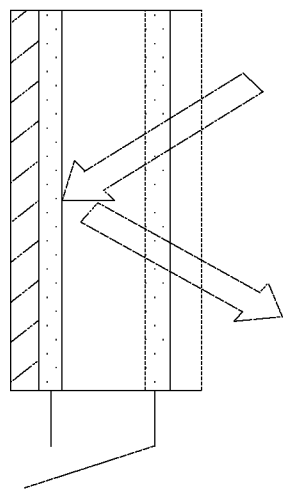
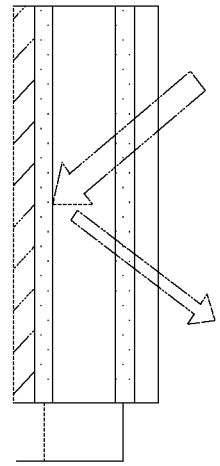
Fig.1a    Fig.1b
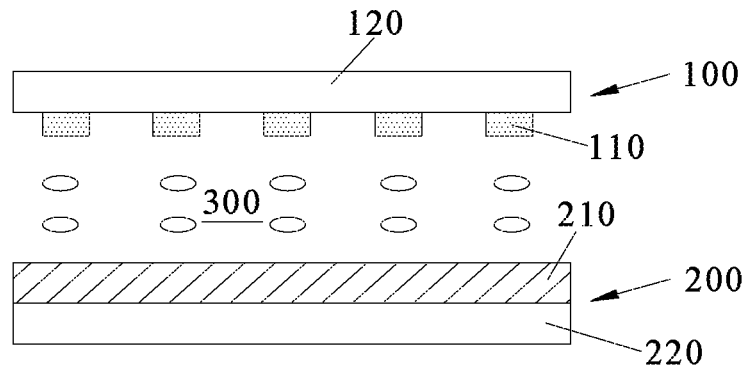
Fig.2
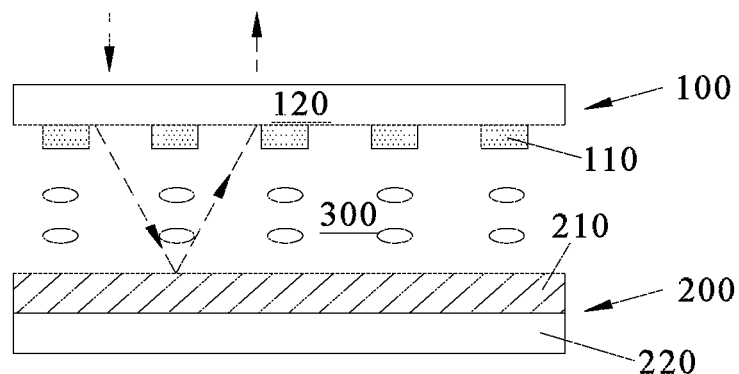
Fig.3

REARVIEW MIRROR

TECHNICAL FIELD

An embodiment of the present invention relates to a part for a vehicle, more specifically, to a rearview mirror.

BACKGROUND

A rearview mirror, as a very important assistant safety device for a vehicle driver, has a function of viewing rear traffic conditions. However, when a driver drives a vehicle in the night, a shining from headlights of a rear vehicle may cause an extensive reflection, cause a dazzle to the driver, and impact safe driving. Therefore, there is a need to develop a rearview mirror with an anti-glare function.

SUMMARY

An embodiment of the present invention provides a rearview mirror with a reliable anti-glare function.

An embodiment of the present invention provides a rearview mirror, wherein the rearview mirror comprises a first substrate, a second substrate cell-assembled to the first substrate, and a crystal material filled between the first substrate and the second substrate, wherein a plurality of strip electrodes are disposed on a side of the first substrate that faces to the second substrate, an interval is formed between two adjacent strip electrodes, and a planar electrode capable of at least partially reflecting light is disposed on a side of the second substrate, which side faces to the first substrate. The plurality of strip electrodes is not electrically connected to each other directly. Such design enables same or different electric signals to be applied to the plurality of strip electrodes.

In some embodiments, the strip electrodes are made of a transparent electrode material.

In some embodiments, the rearview mirror comprises a control circuit, the control circuit is configured for providing an electric signal to the strip electrodes and optionally providing an electric signal to the planar electrode, in order to control a deflection of liquid crystal molecules of the liquid crystal material, and the strip electrodes are independently connected to the control circuit. Herein, "the strip electrodes are independently connected to the control circuit" means that the strip electrodes are independently connected to different output terminals of the control circuit.

In some embodiments, the rearview mirror comprises a control circuit, the control circuit is configured for providing an electric signal to the strip electrodes and optionally providing an electric signal to the planar electrode, in order to control a deflection of liquid crystal molecules of the liquid crystal material, wherein, the control circuit is configured for providing a same electric signal to the plurality of strip electrodes in the case that the rearview mirror is in a normal operation mode; and the control circuit is configured for providing various different electric signals to the plurality of strip electrodes in the case that the rearview mirror is in an anti-glare operation mode.

In some embodiments, the planar electrode is a total reflection electrode.

In some embodiments, the planar electrode is a half-transmission-half-reflection electrode.

In some embodiments, the rearview mirror further comprises a display panel disposed on a side of the second substrate that faces away from the liquid crystal material, and the display panel is configured for displaying an image in the case that the rearview mirror is in a display mode.

In some embodiments, the second substrate together with a substrate which is used as a light-exit surface of the display panel forms into one integrated body, or the second substrate and the substrate which is used as the light-exit surface of the display panel are a same substrate.

In some embodiments, the display panel is a liquid crystal display panel or an organic light-emitting diode display panel.

In some embodiments, the control circuit is configured for providing a same electric signal to the plurality of strip electrodes in the case that the rearview mirror is in a display mode, such that light emitted by the display panel can exit after passing through the second substrate, the liquid crystal material between the first substrate and the second substrate, and the first substrate sequentially.

In some embodiments, the rearview mirror further comprises a brightness sensor, the brightness sensor is configured for detecting a brightness change around the rearview mirror, in the case that the brightness change around the rearview mirror detected by the brightness sensor is greater than a preset value, the brightness sensor sends a first sensor signal to the control circuit, and the control circuit provides various voltage signals to the plurality of strip electrodes respectively upon receiving the first sensor signal; and in the case that the brightness change around the rearview mirror detected by the brightness sensor is not greater than the preset value, the brightness sensor sends a second sensor signal to the control circuit, and the control circuit provides a same voltage signal to the plurality of strip electrodes respectively upon receiving the second sensor signal.

An embodiment of the present invention also provides a method for controlling the above mentioned rearview mirror, comprising providing various different electric signals to the plurality of strip electrodes. In some embodiments, providing various different electric signals to the plurality of strip electrodes comprises providing electric signals which change periodically along an arrangement direction of the plurality of strip electrodes to the plurality of strip electrodes.

In some embodiments, the method for controlling the above mentioned rearview mirror further comprises providing a same electric signal to the plurality of strip electrodes.

It can be seen from the above description that in an embodiment of the present invention, a refractive index of a liquid crystal material in a rearview mirror can be changed by changing a voltage signal being provided to the rearview mirror, such that an anti-glare operation mode of the rearview mirror can be achieved. In comparison to electrochromism caused by a chemical reaction, the rearview mirror of the present invention can achieve the switch between an anti-glare operation mode and a normal operation mode more rapidly and more reliably.

BRIEF DESCRIPTION OF THE DRAWINGS

In order to illustrate a technical proposal of the present invention more clearly, figures of each embodiment will be described briefly below. Obviously, figures described below only relate to some embodiments of the present invention, but not limitations to the present invention.

FIG. 1*a* is a schematic diagram illustrating a principle of an electrochromic anti-glare rearview mirror in a normal operation mode.

FIG. 1b is a schematic diagram illustrating a principle of an electrochromic anti-glare rearview mirror in an anti-glare operation mode.

FIG. 2 is a schematic diagram of a first embodiment of a rearview mirror provided by an embodiment of the present invention.

FIG. 3 is a schematic diagram illustrating a principle of the rearview mirror shown in FIG. 2 in a normal operation mode.

REFERENCE SIGNS

Figure 4:
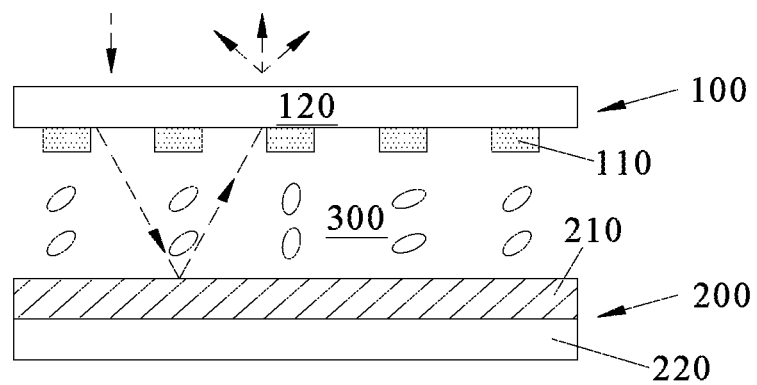
FIG. 4 is a schematic diagram illustrating a principle of the rearview mirror shown in FIG. 2 in an anti-glare operation mode.

100: first substrate 110: strip electrode
120: first transparent substrate 200: second substrate
210: planar electrode 220: second transparent substrate
300: liquid crystal material 400: display panel.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the described embodiments are only partial embodiments of the present invention but not all the embodiments. All the other embodiments obtained by those skilled in the art without creative efforts on the basis of the embodiments of the present invention illustrated shall fall within the scope of protection of the present invention.

Anti-glare rearview mirrors as shown in FIG. 1a and FIG. 1b are electrochromic anti-glare rearview mirrors.

An anti-glare function of an electrochromic anti-glare rearview mirrors is achieved by controlling a color change of an electrochromic layer by voltage, such that light being reflected into human eyes is reduced.

FIG. 1a shows a schematic diagram illustrating a principle of an electrochromic anti-glare rearview mirror in a normal operation mode. As shown in the figure, light entered into the electrochromic anti-glare rearview mirror is completely reflected because the rearview mirror is not electrified. FIG. 1b is a schematic diagram illustrating a principle of an electrochromic anti-glare rearview mirror in an anti-glare operation mode. As shown in the figure, the rearview mirror is electrified, and a part of light entered in to the rearview mirror is absorbed and the other part is reflected.

An electrochromic anti-glare rearview mirror is filled with a transparent conductive oxide, $WO_3$. In the case that a voltage is applied thereto, the transparent conductive oxide $WO_3$ is converted to blue $M_xWO_3$, wherein M is any one of H, Li, and Na). In the case that light enters, blue $M_xWO_3$ is capable of absorbing a part of the light, such as to reduce an intense of light being reflected to the eyes of a driver, and achieve the objective of anti-glare.

However, the anti-glare function of the electrochromic anti-glare rearview mirror in FIG. 1a and FIG. 1b is achieved by a chemical reaction, and has slower electrochromic speed and lower reliability.

Figure 5:
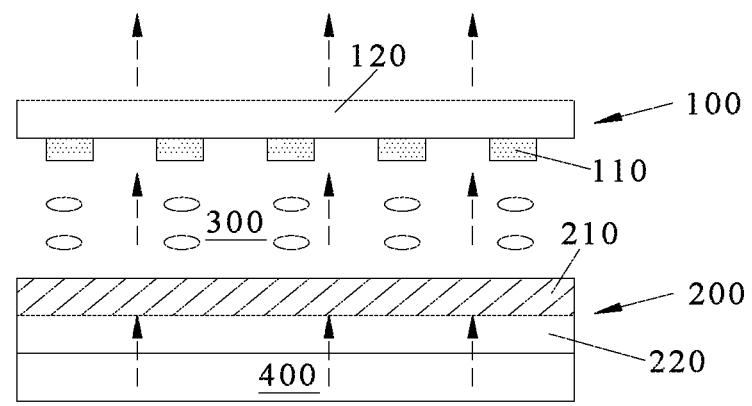
FIG. 5 is a schematic diagram of a second embodiment of a rearview mirror provided by an embodiment of the present invention, and wherein the rearview mirror is in a display operation mode.

As shown in FIG. 2 and FIG. 5, an embodiment of the present invention provides a rearview mirror, wherein the rearview mirror comprises a control circuit (not shown), a first substrate 100, a second substrate 200 cell-assembled to the first substrate 100, and a crystal material 300 filled between the first substrate 100 and the second substrate 200, a plurality of strip electrodes 110 are disposed on a side of the first substrate 100 that faces to the second substrate 200, an interval is formed between two adjacent strip electrodes 110, the strip electrodes 110 are made of a transparent electrode material, a planar electrode 210 capable of at least partially reflecting light is disposed on a side of the second substrate 200 that faces to the first substrate 100. The control circuit is configured for providing an electric signal to the strip electrodes 110 and the planar electrode 210, in order to control a deflection of liquid crystal molecules of the liquid crystal material 300. The size of the interval formed between the strip electrodes 110 can be set as required. It can be greater than, equal to, or less than the width of the strip electrodes 110. The transparent electrode materials can be those commonly used by a skilled person in the art, such as an ITO electrode.

The control circuit is configured for providing a same electric signal to the plurality of strip electrodes in the case that the rearview mirror is in a normal operation mode.

The control circuit is configured for providing various different electric signals to the plurality of strip electrodes in the case that the rearview mirror is in an anti-glare operation mode. It should be noted that, types of the various different electric signals can be equal to the amount of the plurality of strip electrodes (that is to say, electric signals for any two strip electrodes are different), or can be less that the amount of the plurality of strip electrodes (that is to say, electric signals for some strip electrodes are same). In some embodiments, in the case that various different electric signals are provided to the plurality of strip electrodes, the various different electric signals change periodically along an arrangement direction of the strip electrodes. In some embodiments, the electric signal refers to voltage. In one period, an electric signal changes from the lowest voltage to the highest voltage, and then back to the lowest voltage. As used herein, the lowest voltage refers to a voltage which cannot induce a rotation of liquid crystal molecules, and the highest voltage refers to a voltage which induces a maximum rotation of liquid crystal molecules. Because various liquid crystal molecules might correspond to various voltage ranges, the voltage range being applied is not limited in the present invention. In some embodiments, a width of a change period of electric signals being applied to the plurality of strip electrodes is less than or equal to $\frac{1}{10}$ or $\frac{1}{100}$ of a width of the rearview mirror, or less. In the case that a width of a change period of electric signals being applied to the plurality of strip electrodes is less than or equal to $\frac{1}{10}$ or $\frac{1}{100}$ of a width of the rearview mirror, or less, an anti-glare function can be achieved uniformly along the width direction of the rearview mirror.

Herein, the planar electrode being capable of at least partially reflecting light includes two conditions: first, the planar electrode is a total reflection electrode, which is capable of reflecting all of light irradiated on the planar electrode; second, the planar electrode is a half-transmission-half-reflection electrode, which is capable of reflecting part of light irradiated on the planar electrode, and the other part of light transmits the planar electrode. In some embodiments, the planar electrode can reflect 50-90% of light irradiated on the planar electrode. In some embodiments, the planar electrode can reflect 30-45% of light irradiated on the planar electrode.

In a normal operation mode of the rearview mirror, electric signals are provided to the planar electrodes 210 and the strip electrodes 110 respectively by the control circuit, wherein electric signals provided to the plurality of strip electrodes 110 by the control circuit are same, such that an electric field between the first substrate 100 and the second substrate 200 is uniform and therefore the deflection degrees of liquid crystal molecules in the liquid crystal material 300 are same. At this point, refractive indices in the rearview mirror are also same everywhere. Light transmitted the first substrate 100 and entering into the rearview mirror exits the first substrate 100 directly after being reflected by the planar electrode 210, as shown in FIG. 3. In an embodiment of the present invention, the strip electrode 110 can be disposed on the first transparent substrate 120, and the planar electrode 210 can be disposed on the second transparent substrate 220.

In an anti-glare operation mode of the rearview mirror, electric signals are provided to the planar electrodes 210 and the strip electrodes 110 respectively by the control circuit, wherein voltage signals applied to at least part of the strip electrodes 110 are different from voltage signals applied to the other strip electrodes 110. It can be seen from the above description that in the case that the rearview mirror is in an anti-glare operation mode, an electric field between the first substrate and the second substrate is not uniform, such that deflection degrees of liquid crystal molecules at different position in the liquid crystal material 300 are different, rendering the refractive indices in the rearview mirror are not same everywhere. In the described anti-glare operation mode, light transmitted the first substrate 100 and entering into the rearview mirror is refracted to various directions by the liquid crystal material 300, as shown in FIG. 4, such that an intense of light entering into human eyes is reduced and an anti-glare function is achieved.

It should be illustrated that, in FIG. 3 and FIG. 4, the direction indicated by a dashed arrow is a propagation direction of light.

It can be seen from the above description that in an embodiment of the present invention, a refractive index of a liquid crystal material in a rearview mirror can be changed by changing a voltage signal provided to a rearview mirror, such that an anti-glare operation mode of the rearview mirror can be achieved. In comparison to electrochromism caused by a chemical reaction, the rearview mirror of the present invention can achieve the switch between an anti-glare operation mode and a normal operation mode more rapidly and more reliably.

In addition, the rearview mirror provided in an embodiment of the present invention employs a liquid crystal material, and has relatively longer useful life.

In the case that a planar electrode 210 is a half-transmission-half-reflection electrode, as shown in FIG. 5, the rearview mirror also comprises a display panel 400 disposed on a side of the second substrate 200, which side faces away from the liquid crystal material 300. That is to say, one side of the second substrate 200 is the display panel 400 and the other side is the liquid crystal material 300. In the case that a vehicle is in a stopped state, the display panel 400 can be switched on and an image source is accessed to the display panel and is converted to a display signal by the control circuit, such that the display panel 400 can display an image. Because the planar electrode 210 is a half-transmission-half-reflection electrode, light emitted by the display panel 400 can exit after passing through the planar electrode 210 and enters human eyes. In FIG. 5, the direction indicated by a dashed arrow is a propagation direction of light.

Of cause, the display panel 400 can also have an independent drive circuit. That is to say, deflection of liquid crystal molecules between the first substrate and the second substrate is controlled by using the control circuit, and display is performed by controlling the display panel 400 using an independent drive circuit.

In an embodiment of the present invention, a specific structure of the display panel 400 is not specifically limited. For example, the display panel 400 can be an organic light-emitting diode display panel, and can also be a liquid crystal display panel.

As shown in FIG. 5, the display panel 400 can be disposed under the second transparent substrate 220 by laminating or attaching. In some embodiments, in order to reduce a thickness of the rearview mirror, the second substrate together with a substrate which is used as a light-exit surface of the display panel forms into one integrated body. That is to say, the planar electrode 210 can be formed on the light-exit surface of the display panel 400.

In some embodiments, in the case that the rearview mirror is in a display operation mode, the control circuit is configured for providing a same electric signal to the plurality of strip electrodes, in order that a viewer can see a clear and true image. Since the plurality of strip electrodes receives a same electric signal, an electric field between the first substrate and the second substrate is uniform and therefore the refractive indices of the liquid crystal materials in the liquid crystal material 300 are same. Therefore, light emitted by the display panel 400 can transmit the second substrate 200, the liquid crystal material 300 and the first substrate 100, and enters human eyes substantially without deviation.

In an embodiment of the present invention, an operation mode of the rearview mirror can be set manually. For example, in the case that a vehicle is in a stopped state, the display panel 400 can be switched on manually to provide an image signal to the rearview mirror, such that the rearview mirror is in a display operation mode. In the case that driving in the daytime, the display panel 400 can be switched off manually and the rearview mirror is set to a normal operation mode. That is to say, a same voltage is provided to the plurality of strip electrodes 110 by using the control circuit, such that refractive indices of liquid crystal materials 300 in the rearview mirror are same everywhere. In the case that driving in the night, the backlight source can be switched off manually and the rearview mirror is set to an anti-glare operation mode. That is to say, different voltages are provided to the plurality of strip electrodes 110 by using the control circuit, such that refractive indices of liquid crystal materials 300 at different areas in the rearview mirror are different.

In some embodiments, in order to regulate the operation mode of the rearview mirror in an intelligent way, the rearview mirror also comprises a brightness sensor, such brightness sensor is configured for detecting a brightness change around the rearview mirror. In some embodiments, the brightness sensor is disposed at an edge of the rearview mirror, or is disposed at a center of the rearview mirror. In the case that the brightness change around the rearview mirror detected by the brightness sensor is greater than a preset value, it indicates that relatively intensive light enters the rearview mirror suddenly; and in the case that the brightness change around the rearview mirror detected by the brightness sensor is not greater than the preset value, it indicates that there is no relatively intensive light enters the rearview mirror. Such a preset value can be set as required, or as the requirement of a viewer or a user of the rearview mirror (a driver of a vehicle). For example, such a preset value can be 40%, 50%, 80%, 100%, or 200%, etc., corresponding to the following conditions respectively: a relatively intensive light enters the rearview mirror and is detected by the brightness sensor, and the brightness change around the rearview mirror is greater than or equal to 40%, 50%, 80%, 100%, or 200%.

In the case that the brightness change around the rearview mirror detected by the brightness sensor is greater than a preset value, the brightness sensor sends a first sensor signal to the control circuit, and the control circuit provides various different voltage signals to the plurality of strip electrodes respectively upon receiving the first sensor signal. That is to say, under the circumstances, the rearview mirror is in an anti-glare operation mode.

In the case that the brightness change around the rearview mirror detected by the brightness sensor is not greater than the preset value, the brightness sensor sends a second sensor signal to the control circuit, and the control circuit provides a same voltage signal to the plurality of strip electrodes respectively upon receiving the second sensor signal. That is to say, under the circumstances, the rearview mirror is in a normal operation mode.

By disposing a brightness sensor, an intelligent regulation operation mode of the rearview mirror can be achieved, and drive safety is improved.

An embodiment of the present invention also provides a method for controlling the above mentioned rearview mirror, comprising providing various different electric signals to the plurality of strip electrodes. In some embodiments, providing various different electric signals to the plurality of strip electrodes comprises providing electric signals which change periodically along an arrangement direction of the plurality of strip electrodes to the plurality of strip electrodes. In an anti-glare operation mode of the rearview mirror, providing various different electric signals to the plurality of strip electrodes enables different deflection degrees of liquid crystal molecules at different position in the liquid crystal material, rendering the refractive indices in the rearview mirror are not same everywhere. Light transmitted the first substrate and entering into the rearview mirror is refracted to various directions by the liquid crystal material, such that an intense of light entering into human eyes is reduced and an anti-glare function is achieved. In some embodiments, the application mode of the different electric signals can be optimized by providing electric signals which change periodically along an arrangement direction of the plurality of strip electrodes to the plurality of strip electrodes. In the case that a width of a change period of electric signals being applied is less than or equal to $\frac{1}{10}$ or $\frac{1}{100}$ of a width of the rearview mirror, or even less, an anti-glare function can be achieved uniformly along the width direction of the rearview mirror for human eyes.

In some embodiments, the method for controlling the above mentioned rearview mirror further comprises providing a same electric signal to the plurality of strip electrodes. In an operation mode other than an anti-glare operation mode, a same electric signal can be provided to the plurality of strip electrodes.

The forgoing is only the preferred embodiments of the present invention and not intended to limit the scope of protection of the present invention. The scope of protection of the present invention should be defined by the appended claims.

The present invention claims priority of the Chinese patent application No. 201510094425.8, filed on Mar. 3, 2015, the disclosure of which is incorporated herein by reference as part of the application.

What is claimed is:

1. A rearview mirror, comprising:
a first substrate,
a second substrate cell-assembled to the first substrate,
a liquid crystal material filled between the first substrate and the second substrate, and
a control circuit,
wherein a plurality of strip electrodes are disposed on a side of the first substrate that faces to the second substrate, an interval is formed between two adjacent strip electrodes, and a planar electrode capable of at least partially reflecting light is disposed on a side of the second substrate, which side faces to the first substrate; the rearview mirror is configured to have a normal operation mode, in which the control circuit is configured to provide the plurality of strip electrodes with a same electric signal concurrently.

2. The rearview mirror according to claim 1, wherein the strip electrodes are made of a transparent electrode material.

3. The rearview mirror according to claim 1, wherein the control circuit is further configured for providing an electric signal to the strip electrodes and providing an electric signal to the planar electrode, in order to control a deflection of liquid crystal molecules of the liquid crystal material, and the strip electrodes are independently connected to the control circuit.

4. The rearview mirror according to claim 1, wherein the planar electrode is a total reflection electrode.

5. The rearview mirror according to claim 1, wherein the planar electrode is a half-transmission-half-reflection electrode.

6. The rearview mirror according to claim 1, wherein the rearview mirror further comprises a display panel disposed on a side of the second substrate, which side faces away from the liquid crystal material, and the rearview mirror is further configured to have a display mode, in which the display panel is configured for displaying an image.

7. The rearview mirror according to claim 6, wherein the second substrate together with a substrate where a light-exit surface of the display panel lies forms into one integrated body, or the second substrate and the substrate where the light-exit surface of the display panel lies are a same substrate.

8. The rearview mirror according to claim 6, wherein the display panel is a liquid crystal display panel or an organic light-emitting diode display panel.

9. The rearview mirror according to claim 1, wherein the rearview mirror further comprises a brightness sensor, the brightness sensor is configured for detecting a brightness change around the rearview mirror,
wherein the brightness sensor is configured to send a sensor signal to the control circuit according to the brightness change detected by the brightness sensor, and the control circuit is configured to provide various voltage signals or a same voltage signal to the plurality of strip electrodes respectively upon receiving the first sensor signal.

10. A method for controlling the rearview mirror according to claim 1, comprising providing various different electric signals to the plurality of strip electrodes.

11. The method according to claim 10, further comprising providing a same electric signal to the plurality of strip electrodes.

12. The method according to claim 10, wherein providing various different electric signals to the plurality of strip electrodes comprises providing electric signals which change periodically along an arrangement direction of the plurality of strip electrodes to the plurality of strip electrodes.

13. The method according to claim 11, wherein providing various different electric signals to the plurality of strip electrodes comprises providing electric signals which change periodically along an arrangement direction of the plurality of strip electrodes to the plurality of strip electrodes.

14. The rearview mirror according to claim 2, wherein the control circuit is configured for providing an electric signal to the strip electrodes and providing an electric signal to the planar electrode, in order to control a deflection of liquid crystal molecules of the liquid crystal material, and the strip electrodes are independently connected to the control circuit.

15. The rearview mirror according to claim 2, wherein the control circuit is configured for providing an electric signal to the strip electrodes and providing an electric signal to the planar electrode, in order to control a deflection of liquid crystal molecules of the liquid crystal material, wherein,
the rearview mirror is further configured to have an anti-glare operation mode;
the control circuit is configured for providing a same electric signal to the plurality of strip electrodes in the normal operation mode; and
the control circuit is configured for providing different electric signals to the plurality of strip electrodes in the anti-glare operation mode.

16. The rearview mirror according to claim 2, wherein the planar electrode is a total reflection electrode.

17. The rearview mirror according to claim 2, wherein the planar electrode is a half-transmission-half-reflection electrode.

18. A rearview mirror, comprising a first substrate, a second substrate cell-assembled to the first substrate, and a liquid crystal material filled between the first substrate and the second substrate, wherein a plurality of strip electrodes are disposed on a side of the first substrate that faces to the second substrate, an interval is formed between two adjacent strip electrodes, and a planar electrode capable of at least partially reflecting light is disposed on a side of the second substrate, which side faces to the first substrate,
and the rearview mirror comprises a control circuit, the control circuit is configured for providing an electric signal to the strip electrodes and providing an electric signal to the planar electrode, in order to control a deflection of liquid crystal molecules of the liquid crystal material, wherein,
the rearview mirror is configured to have a normal operation mode and an anti-glare operation mode;
the control circuit is configured for providing a same electric signal to the plurality of strip electrodes in the normal operation mode; and
the control circuit is configured for providing different electric signals to the plurality of strip electrodes in the anti-glare operation mode.

19. A rearview mirror, comprising a first substrate, a second substrate cell-assembled to the first substrate, and a liquid crystal material filled between the first substrate and the second substrate,
wherein a plurality of strip electrodes are disposed on a side of the first substrate that faces to the second substrate, an interval is formed between two adjacent strip electrodes, and a planar electrode capable of at least partially reflecting light is disposed on a side of the second substrate, which side faces to the first substrate;
the rearview mirror further comprises a control circuit and a display panel disposed on a side of the second substrate, which side faces away from the liquid crystal material, and the rearview mirror is configured to have a display mode, in which the display panel is configured for displaying an image;
the control circuit is configured for providing a same electric signal to the plurality of strip electrodes, so that light emitted by the display panel can exit after passing through the second substrate, the liquid crystal material between the first substrate and the second substrate, and the first substrate sequentially.

20. The rearview mirror according to claim 19, wherein the rearview mirror further comprises a brightness sensor, the brightness sensor is configured for detecting a brightness change around the rearview mirror,
wherein the brightness sensor is configured to send a sensor signal to the control circuit according to the brightness change detected by the brightness sensor, and the control circuit is configured to provide various voltage signals or a same voltage signal to the plurality of strip electrodes respectively upon receiving the sensor signal.

* * * * *